United States Patent
Higashiyama et al.

(10) Patent No.: US 10,162,647 B2
(45) Date of Patent: Dec. 25, 2018

(54) INFORMATION APPARATUS

(71) Applicant: Mitsubishi Electric Corporation, Tokyo (JP)

(72) Inventors: Tomohiko Higashiyama, Tokyo (JP); Mitsuo Shimotani, Tokyo (JP); Nobuteru Okada, Tokyo (JP); Hideharu Yasutake, Tokyo (JP); Makoto Mikuriya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 15/102,691

(22) PCT Filed: Dec. 9, 2013

(86) PCT No.: PCT/JP2013/007230
§ 371 (c)(1),
(2) Date: Jun. 8, 2016

(87) PCT Pub. No.: WO2015/087365
PCT Pub. Date: Jun. 18, 2015

(65) Prior Publication Data
US 2016/0371094 A1  Dec. 22, 2016

(51) Int. Cl.
*G06F 9/44* (2018.01)
*G06F 9/4401* (2018.01)
*G06F 9/445* (2018.01)

(52) U.S. Cl.
CPC ............ *G06F 9/4405* (2013.01); *G06F 9/445* (2013.01); *G06F 9/4406* (2013.01); *G06F 9/4411* (2013.01)

(58) Field of Classification Search
CPC ..... G06F 1/32; G06F 1/26; G06F 1/28; G06F 1/00

(Continued)

(56) References Cited

U.S. PATENT DOCUMENTS 5,295,264 A * 3/1994 Werres ............... H04Q 11/0428
718/103
7,171,549 B2 * 1/2007 Machida ............... G06F 9/4406
713/1

(Continued)

FOREIGN PATENT DOCUMENTS

CN 101751114 A 6/2010
JP 2007-272275 A 10/2007

(Continued)

OTHER PUBLICATIONS

Chinese Office Action dated Aug. 27, 2018 in corresponding Chinese Application No. 201380081481.7.

*Primary Examiner* — Jaweed A Abbaszadeh
*Assistant Examiner* — Keshab R Pandey
(74) *Attorney, Agent, or Firm* — Birch, Stewart, Kolasch & Birch, LLP (57) ABSTRACT

An information apparatus includes: a device to operate according to plural pieces of setting information by plural initialization processings; and a processor including a first control unit to execute, on basic software, first software performing processing using the device, and a second control unit to execute second software that operates the device using part of the setting information by the plural initialization processings and performs processing using the device at a stage when part of the plural initialization processings is completed and before the first software is executed, and performing the plural initialization processings for the device.

5 Claims, 11 Drawing Sheets

(58) Field of Classification Search
USPC ....... 713/300, 310, 320, 321, 322, 323, 324, 713/340, 375
See application file for complete search history.

(56) References Cited

U.S. PATENT DOCUMENTS

| | | |
|---|---|---|
| 8,051,281 B2 | 11/2011 | Okamoto et al. |
| 2005/0132181 A1* | 6/2005 | Kashiwada ........... G06F 1/3203 713/100 |
| 2006/0133362 A1* | 6/2006 | Stein ....................... G06F 9/441 370/360 |
| 2010/0049960 A1* | 2/2010 | Okamoto .............. G06F 9/4401 713/1 |
| 2010/0137035 A1 | 6/2010 | Shan et al. |

FOREIGN PATENT DOCUMENTS

| | | |
|---|---|---|
| JP | 2008-165554 A | 7/2008 |
| JP | 2008-186175 A | 8/2008 |
| JP | 2009-175904 A | 8/2009 |
| JP | 2009-284023 A | 12/2009 |
| JP | 2012-28868 A | 2/2012 |
| JP | 2013-45382 A | 3/2013 |
| JP | 2013-152509 A | 8/2013 |

\* cited by examiner

| Device name | Information to be stored | | | |
|---|---|---|---|---|
| Camera | Initialization state information | I/O register set time | Focus | Surroundings illuminance |
| Display | Initialization state information | I/O register set time | Size | Resolution | Frame rate |

Fig. 11

| Application | Information to be stored | | |
|---|---|---|---|
| | Execution state | Driving trajectory information | Alarm information |
| Rear view camera display application | | | |

INFORMATION APPARATUS

TECHNICAL FIELD

The present invention relates to a quick start for processing in an embedded device.

BACKGROUND ART

It is sometimes required for embedded devices to quickly start specific processing. For example, it is required for car navigation systems to display a rear view camera image on a car navigation screen in a short time after turning on the power. Recently, it is also becoming popular to adopt a multi-core environment for high-function information apparatuses such as car navigation systems. Furthermore, in the high-function information apparatuses such as car navigation systems, it is required from a viewpoint of performance that a high-function versatile OS (Operating System) playing a main function operates fully using resources of an embedded device. In such situations, a method (for example, Patent Document 1) is proposed in which, in a multi-core environment, a dedicated core is provided to quickly start specific processing having a necessity to be quickly started (hereinafter called as specific processing); a versatile OS is started in another core; and after completing activating the versatile OS, the control by the dedicated core is transferred to the versatile OS, so that the versatile OS starts SMP (Symmetric Multiple Processor) operation to thereafter perform the specific processing.

CITATION LIST

Patent Literature

Patent Document 1: Japanese Patent Laid-Open Publication No. 2013-45382

SUMMARY OF THE INVENTION

Technical Problem

In a conventional quick start system, specific processing cannot start until the initialization of a device necessary for the specific processing (hereinafter called as a device 4 for specific processing) is completely finished. Therefore, in a case where the specific processing is required to start in a state in which the initialization of the device for specific processing is not completely finished, the specific processing cannot start until the initialization is finished.

Solution to Problem

An information apparatus according to the present invention includes:

a device to operate according to plural pieces of setting information by plural initialization processings; and a processor including a first control unit to execute, on basic software, first software that performs processing using the device, and a second control unit to execute second software that operates the device using part of the setting information by the plural initialization processings and performs processing using the device at a stage when part of the plural initialization processings is completed and before the first software is executed, and performing an initialization processing for the device.

Advantageous Effects of Invention

According to the present invention, it becomes possible to quickly respond to a specific-processing start event.

DESCRIPTION OF EMBODIMENTS

Embodiment 1

Figure 1:
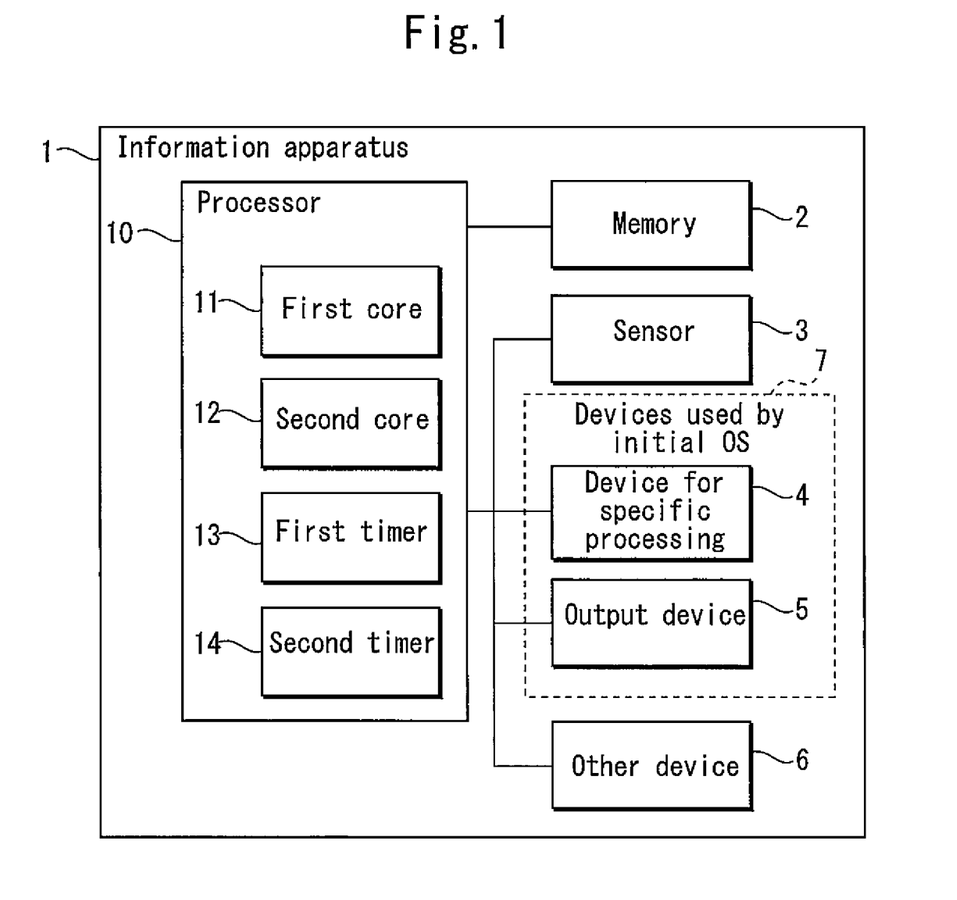
FIG. 1 is a block diagram showing the configuration of an information apparatus according to Embodiment 1.

First, a configuration of Embodiment 1 will be explained. FIG. 1 is a block diagram showing the configuration of an information apparatus 1 realizing a specific processing start method in this embodiment. In FIG. 1, numeral 10 designates a processor in which plural cores are integrated in a single package; in this embodiment, a processor is used as an example in which two cores are integrated in a single package. The processor 10 includes not only a first core 11 and a second core 12, but also a first timer 13 and a second timer 14. The first timer 13 is a timer used for the first core 11, and the second timer 14 is used for the second core 12.

In this embodiment, the first core 11 is a first control unit, and the second core 12 is a second control unit. In addition, it is not necessary that the first control unit and the second control unit are built in the single processor 10; plural microprocessors are allowed to be used as the first and second control units.

In FIG. 1, a memory 2 is a storage device which is connected through a bus to the processor 10 to store information such as data or a program.

A sensor 3 is used to determine whether to start specific processing for a device 4 for specific processing or to determine whether to end the specific processing. The sensor 3 may be a sensor to sense a state of an in-vehicle device, for example a sensor to sense an operation for shifting to a specific gear, or a sensor to sense a variation in a state from outside, for example a variation in temperature or humidity.

The device 4 for specific processing is a device such as a rear view camera in a car navigation system, which is necessary for processing requiring quick start (specific processing). Furthermore, if the device 4 for specific processing remains as it is after turning on the power, a function necessary for the specific processing is not ready to be used; therefore, it is necessary to perform initialization processing according to previously given setting information.

An output device 5 is a device for outputting an output result of the device 4 for specific processing; the output device may be a monitor for displaying images, or an audio device such as a speaker for outputting sound. In this embodiment, the output device 5 is a device which does not need initialization processing, or whose initialization processing can be finished in a short period before a specific-processing start event is generated from the above described sensor 3. The other device 6 represents a device used for a versatile OS (later described); in the figure, only one other device is shown, but a plurality of other devices may be used. Devices 7 used by an initial OS represent devices used for the initial OS (later described), and include a device 4 for specific processing and the output device 5 in this embodiment.

Figure 2:
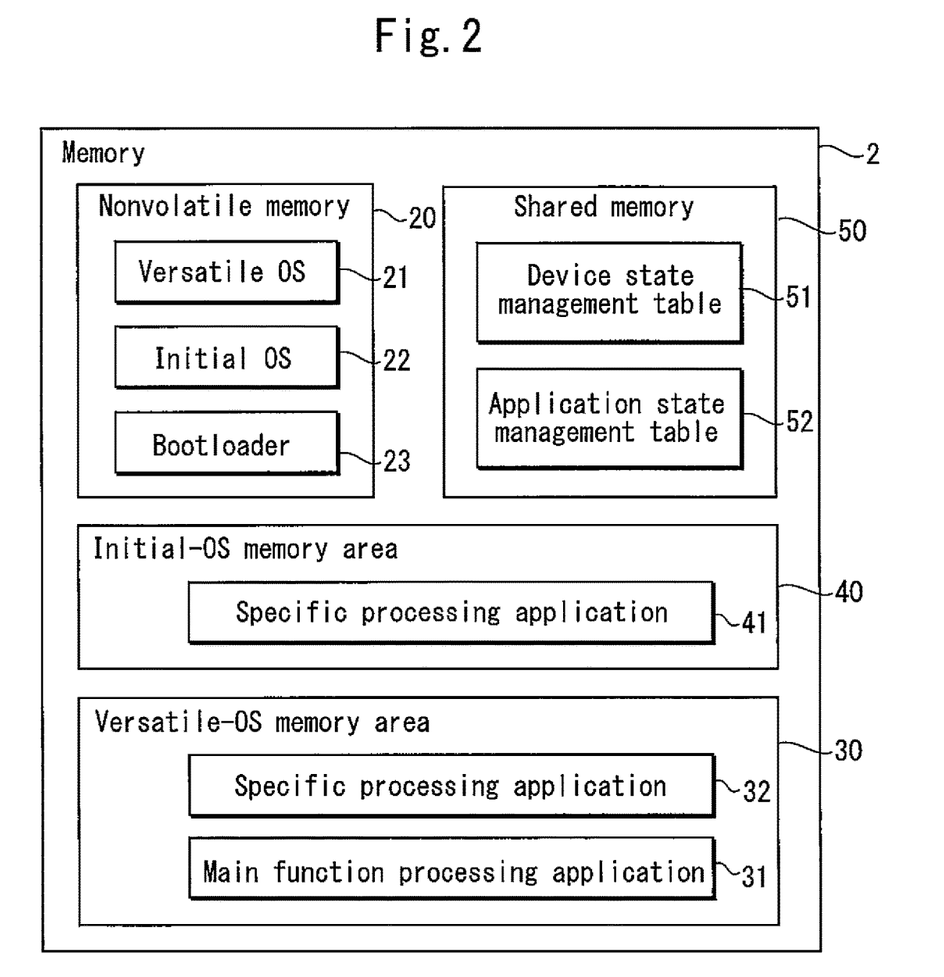
FIG. 2 is a block diagram showing a memory configuration according to Embodiment 1.

FIG. 2 is a block diagram showing the configuration of the memory 2 according to this embodiment and the contents stored therein. In FIG. 2, a nonvolatile memory 20 stores a versatile OS 21 to operate on the first core 11, an initial OS 22 to operate on the second core 12, and a bootloader 23 to be first called after turning on the power to the information apparatus (hereinafter called as "after releasing reset"). After being called, the bootloader 23 loads the initial OS 22 from the nonvolatile memory 20 to an initial-OS memory area 40, and loads the versatile OS 21 from the nonvolatile memory 20 to a versatile-OS memory area 30. The first core 11 executes the versatile OS 21, and the second core 12 executes the loaded initial OS 22.

The versatile-OS memory area 30 includes a specific processing application 32 controlling the device 4 for specific processing and a main function processing application 31 initializing and controlling another device 6.

The initial-OS memory area 40 includes a specific processing application 41 controlling the device 4 for specific processing.

In addition, the specific processing application 41 and the specific processing application 32 are not executed at the same time; after completing activating the versatile OS 21, the processing of the specific processing application 41 is passed to the specific processing application 32. The specific processing application 41 may be the same as the specific processing application 32, or may be different therefrom.

A shared memory 50 includes a device state management table 51 for supervising the states of the devices 7 used by the initial OS, and an application state management table 52 for supervising the state of a specific processing application 41.

Figure 3:
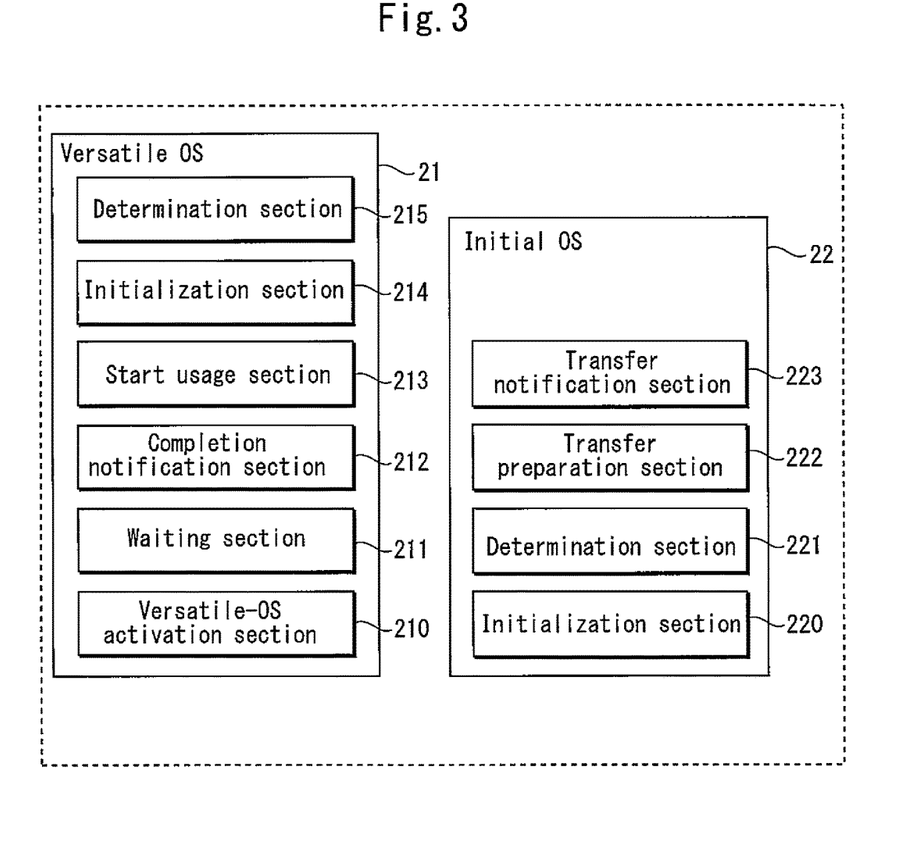
FIG. 3 is a block diagram showing functions of an initial OS and a versatile OS according to Embodiment 1.

FIG. 3 is a block diagram showing procedures performed within the versatile OS 21 and the initial OS 22 in this embodiment.

The versatile OS 21 is basic software to execute main functions of the system. Small scale information apparatuses may not use the versatile OS 21; however, in order to efficiently develop, the versatile OS 21 is used for large scale main processing such as a car navigation system (for example, a navigation function, audio inputting and outputting, or "One-seg") to which to apply this embodiment.

The initial OS 22 is an OS on which specific processing operates until the versatile OS 21 is activated, and the initial OS operates on the second core 12. The initial OS 22 is an OS having limited functions in comparison to the versatile OS 21. In this embodiment, for example, target devices of the versatile OS 21 are the device 4 for specific processing, the output device 5, and the other device 6; however, the only target control device of the initial OS 22 is the device 4 for specific processing. The usage of the initial OS 22 also makes it possible to use a specific processing application developed for the versatile OS 21. In addition, the specific processing application may be operated without using the initial OS 22.

In FIG. 3, when the first core 11 starts the versatile OS 21, a versatile-OS activation section 210 performs initialization processing necessary for the versatile OS 21 itself, and initialization processing for the other device 6.

A waiting section 211 initializes devices 7 used by the initial OS 22 during an activation period, and makes the devices be in a waiting state.

After the versatile OS 21 is activated, a completion notification section 212 notifies the initial OS 22 of the activation completion.

A start usage section 213 makes the versatile OS 21 start using the devices 7 having been used by the initial OS 22.

An initialization section 214 initializes the devices 7 having been used by the initial OS 22.

A determination section 215 selects specific processing according to an initialization state of the device 4 for specific processing, to start and end the specific processing.

When the second core 12 starts the initial OS 22, an initialization section 220 performs initialization processing necessary for the initial OS 22 itself and initializes the devices 7 used by the initial OS.

When a specific-processing start event is received during performing the initialization section 220, a determination section 221 selects specific processing according to an initialization state of the device 4 for specific processing, to start and end the specific processing.

A transfer preparation section 222 prepares for transferring the access control initiative of the devices 7 used by the initial OS from the initial OS 22 to the versatile OS 21.

A transfer notification section 223 notifies the versatile OS 21 of completion of preparation for transferring the devices 7 used by the initial OS.

Next, explanation will be made using FIG. 4 about operations for initializing the device 4 for specific processing (hereinafter called as initialization states). The device 4 for specific processing to be dealt with in this embodiment is a device whose initialization processing can be divided into plural initialization states.

Figure 4:
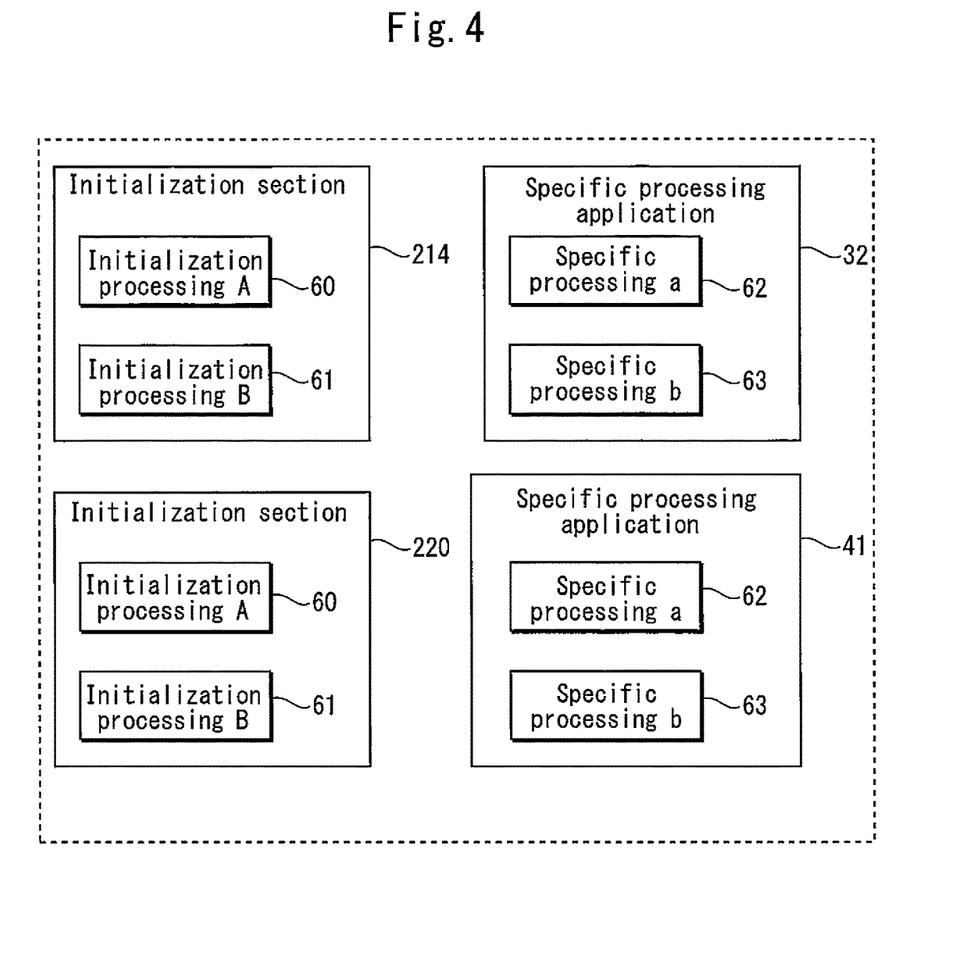
FIG. 4 is a block diagram showing initialization states of a device for specific processing according to Embodiment 1.

In FIG. 4, explanation will be made about an example of the device 4 for specific processing whose initialization processing is divided into two processings of specific-processing-device initialization processing A (hereinafter called as initialization processing A) designated by numeral 60, and specific-processing-device initialization processing B (hereinafter called as initialization processing B) designated by numeral 61. Here, a rear view camera is used as an example. It is assumed that initialization processing necessary for the rear view camera is color setting and image quality setting.

The initialization processing A(60) is initialization processing necessary for setting colors on the device 4 for specific processing. The initialization processing B(61) is initialization processing necessary for setting image quality on the device 4 for specific processing. Furthermore, each of the specific processing application 41 executed in the determination section 221 and the specific processing application 32 executed therein is also divided into two processings according to initialization states of the device 4 for specific processing. Specific processing that is executable in a state after completing only the initialization processing A(60) is referred to as specific processing a(62). In this example, the specific processing a only displays in a grainy image quality state. Specific processing that is executable in a state after also completing the initialization processing B(61) is referred to as specific processing b(63), which displays here in a high image quality and recognizes the position of a face to put a frame around the face.

Next, explanation will be made using FIG. 5 about initialization states of the device 4 for specific processing in this embodiment.

In a case where a specific-processing start event is generated during a period until the initialization processing A(60) is completed (time t1 to time t2), the initial OS 22 starts the specific processing a (62). After that, the initial OS 22 starts the initialization processing B(61) after a specific-processing end event is generated (time t3).

In a case where the specific-processing start event is not generated during the period between the time t1 and the time t2, the initial OS 22 starts the initialization processing B(61) after the initialization processing A(60) is completed. However, in a case where the versatile OS 21 has already been activated when the initialization processing A(60) is completed, it is allowed that the initialization processing B(61) is not performed by the initial OS 22 and transferring to the versatile OS 21 is performed first, and then the initialization processing B(61) is performed by the versatile OS 21.

Next, explanation will be made about process flows of the first core 11 and the second core 12 in this embodiment. A process flow of the first core 11 and the second core 12 in this embodiment is separated into two flows described below.

A first process flow is a flow in which after releasing reset, the initial OS 22 is activated on the second core 12, and then, initialization of the device 4 for specific processing and the specific processing are performed on the second core 12; concurrently, the versatile OS 21 is activated on the first core 11. The first process flow is explained in FIG. 6 and FIG. 7.

A second flow is a flow in which after activating the versatile OS 21 on the first core 11, the device for specific processing is transferred from the initial OS 22 activated on the second core 12 to the versatile OS 21 activated on the first core 11. The second process flow is explained in FIG. 8 and FIG. 9.

Figure 6:
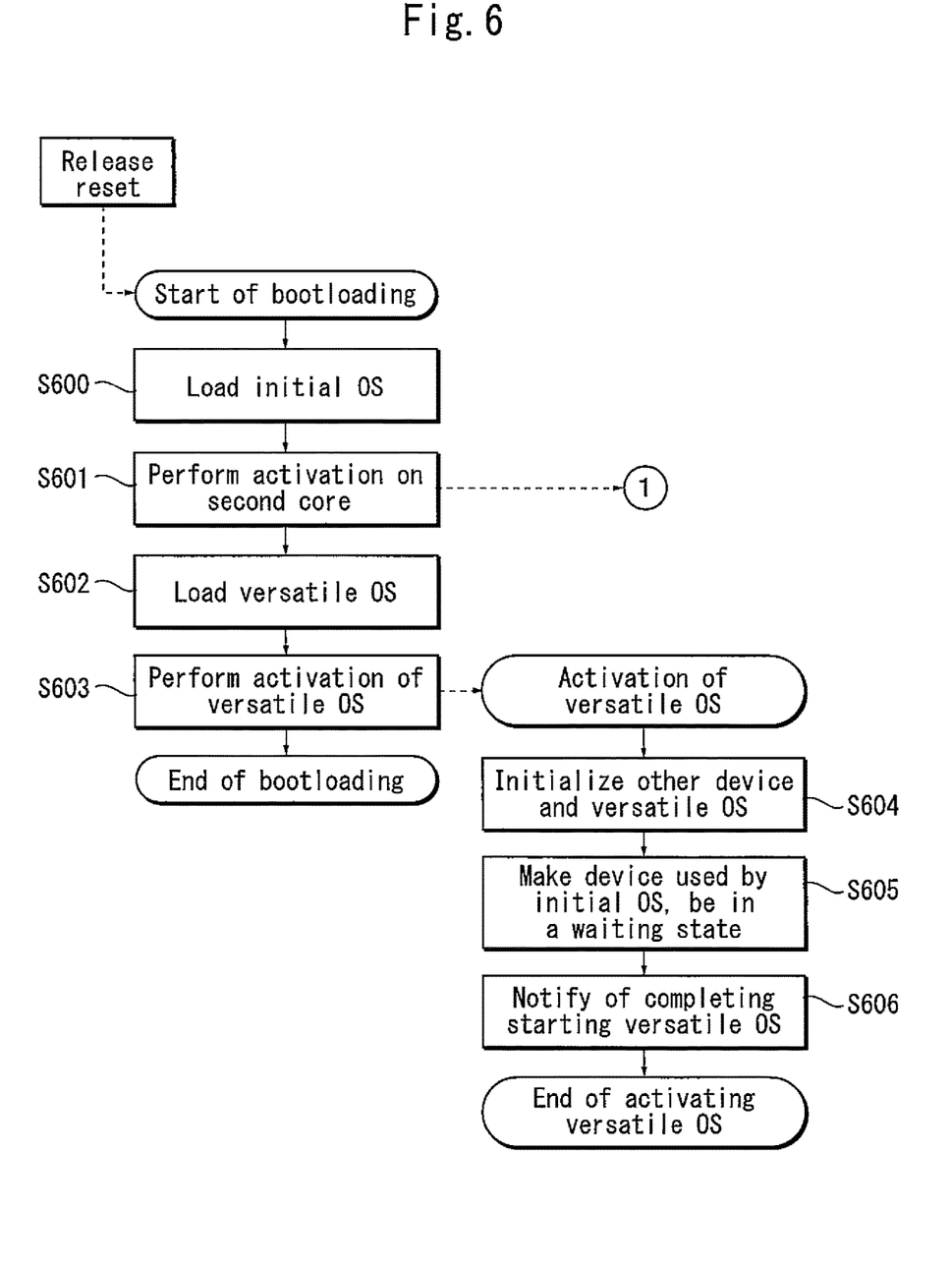
FIG. 6 is a process flow chart of a first core until the versatile OS according to Embodiment 1 is activated.
Figure 7:
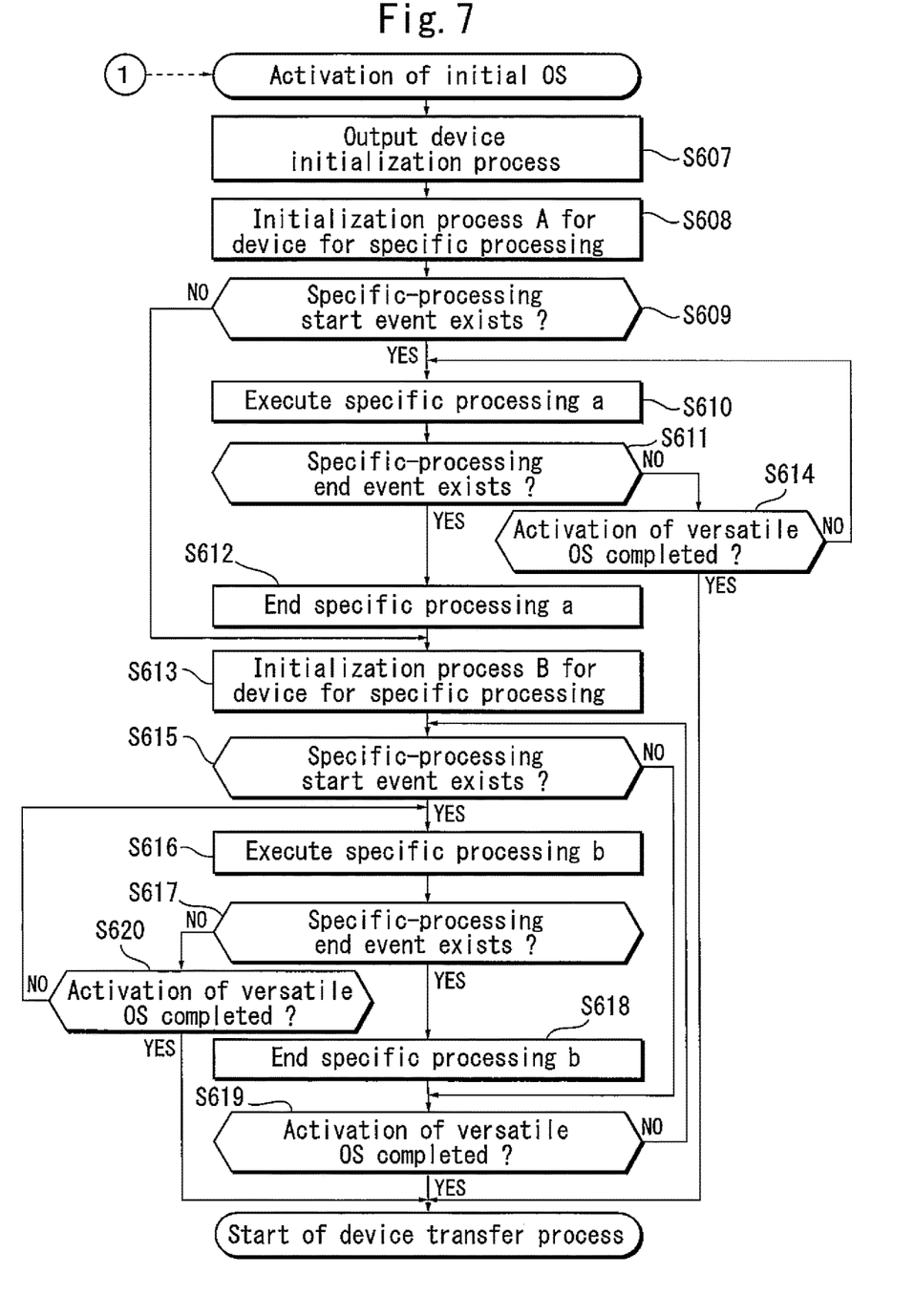
FIG. 7 is a process flow chart of a second core until the versatile OS according to Embodiment 1 is activated.

FIG. 6 and FIG. 7 represent a process flow which starts with quickly activating the initial OS and the specific processing on the second core 12 and ends with activating the versatile OS 21 on the first core 11.

A process flow on the side of the versatile OS 21 will be explained using FIG. 6.

After releasing reset, the first core 11 starts the bootloader 23. In a process flow of the bootloader 23, the initial OS 22 is loaded to the initial-OS memory area 40 (S600), and an address of the loaded initial OS 22 is set to the program counter of the second core 12 to activate the initial OS 22 on the second core 12 (S601).

Next, the first core 11 loads the versatile OS 21 to the versatile-OS memory area 30 (S602), to activate the versatile OS 21 (S603). Similarly to the initial OS 22, the versatile OS 21 is activated by setting an address value of the versatile OS 21 to the program counter of the first core 11.

That concludes the process flow of the bootloader 23 called from the first core 11. From this point forward, the versatile OS 21 and the initial OS 22 simultaneously perform processing on the first core 11 and the second core 12, respectively.

Next, processing on the side of the versatile OS 21 will be explained. The versatile OS 21 initializes the other device 6 and performs activation of the versatile OS 21 (S604). These processings are performed by the versatile-OS activation section 210. Next, the versatile OS 21 performs initialization processing such as loading of device drivers (S605). The devices 7 being used by the initial OS 22 cannot be used by the versatile OS 21; therefore, in this initialization processing, processing influencing the device state is not performed. This processing is performed by the waiting section 211.

Next, the versatile OS 21 notifies the initial OS 22 that the activation of the versatile OS 21 is completed (S606). In addition, as a notification means, the inter-core communication may be used, or a flag by means of a shared memory may be used. This processing is performed by the completion notification section 212.

Next, a process flow on the side of the initial OS 22 will be explained using FIG. 7.

When the initial OS 22 is activated, the initial OS 22 performs initialization processing for the output device 5 (S607). This processing is performed by the initialization section 220.

Next, the initial OS 22 performs the initialization processing A(60) for the device 4 for specific processing (S608). In addition, in a case where a specific-processing start event is generated while the initialization processing A(60) is being performed, the initial OS 22 accepts the event but does not perform the specific processing. This processing is performed by the initialization section 220.

Next, the initial OS 22 determines whether or not a specific-processing start event is generated (S609). In a case where a specific-processing start event has been generated, the specific processing a(62) is kept performed (S610, S611) until a specific-processing end event is generated; when the specific-processing end event is generated, the specific processing a(62) is ended (S612).

These processings (S609, S610, S611, and S612) are performed by the determination section 221.

In addition, in a case where a specific-processing start event has not been generated (S609), the initialization processing B(61) for the device 4 for specific processing is performed (S613).

Next, the initial OS 22 performs the initialization processing B(61) for the device 4 for specific processing (S613). This processing is performed by the initialization section 220. In addition, in a case where a specific-processing start event is not generated (S609) while the initial OS 22 is performing (S608) the initialization processing A(60) for the device 4 for specific processing, the initial OS 22 does not perform the specific processing, but performs (S613) the initialization processing B(61).

At the above-described S611, in a case where the activation of the versatile OS 21 is completed while the initial OS 22 is performing the specific processing a(62), processing for transferring the device from the initial OS 22 to the versatile OS 21 is started (S614). This processing is performed by the determination section 221.

Next, the initial OS 22 determines (S615) whether or not a specific-processing start event has been generated; If generated, the specific processing b(63) is performed (S616) until a specific-processing end event is generated; and if the specific-processing end event is generated (S617), the specific processing b(63) is ended (S618). This processing is performed by the determination section 221.

In a case where a specific-processing start event has not been generated (S615), the initial OS 22 does not perform the specific processing b(63). This processing is performed by the determination section 221.

After the initial OS 22 ends (S618) the specific processing b(63), or in a case where there are no specific-processing start events while the initialization processing B(61) is performed, the initial OS 22 checks whether the activation of the versatile OS 21 is completed (S619).

If the activation is completed, a processing to transfer the device from the initial OS 22 to the versatile OS 21 is started; if the activation is not completed, the completion of activating the versatile OS 21 is waited (S619) while checking whether or not there is a specific-processing start event (S615).

In a case where the initial OS 22 confirms (S620) that the versatile OS 21 has been activated during the performing of the specific processing b(63), the processing to transfer the device from the initial OS 22 to the versatile OS 21 is started. This processing is performed by the determination section 221.

Figure 8:
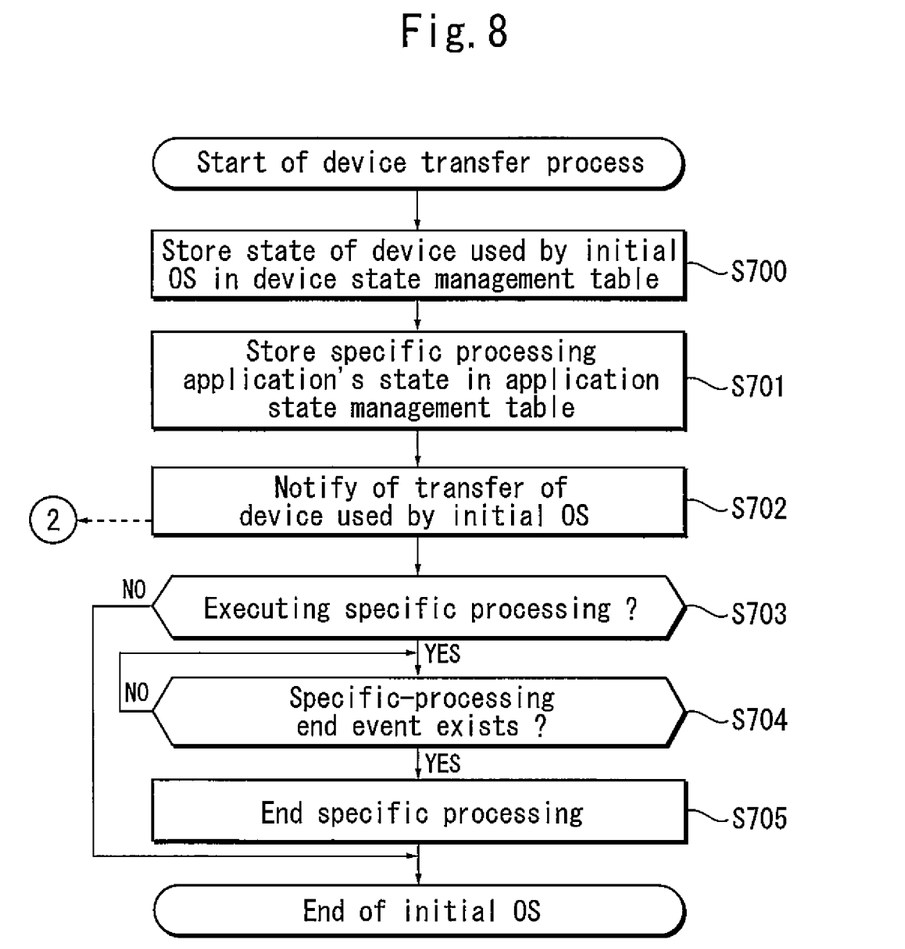
FIG. 8 is a process flow of the second core according to Embodiment 1, which represents the flow from starting transferring a device and to completing the transfer of the device.
Figure 9:
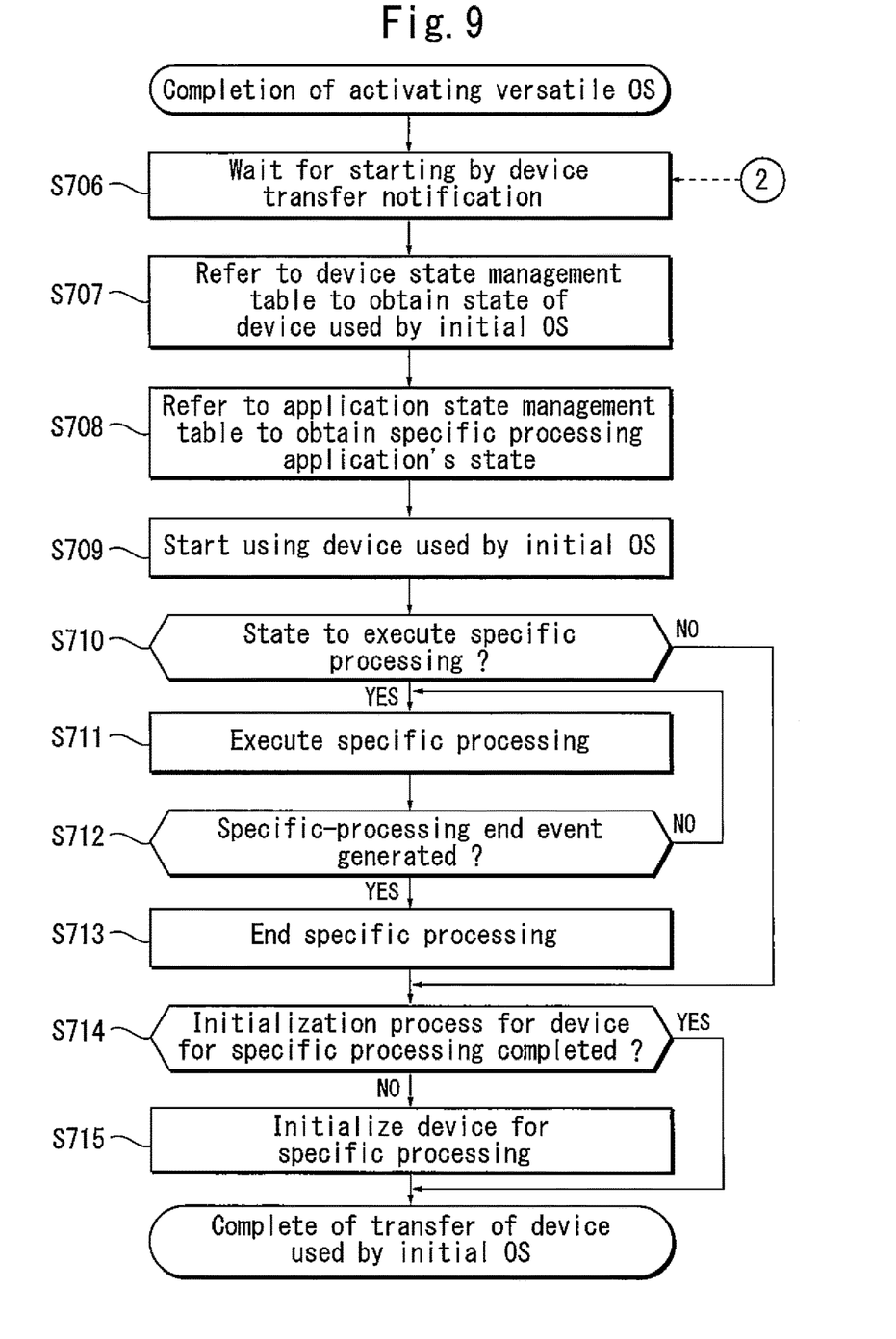
FIG. 9 is a process flow of the first core according to Embodiment 1, which represents the flow from starting transferring the device and to completing the transfer of the device.

FIG. 8 and FIG. 9 represent process flows which begin after completing activating the versatile OS 21, and end with completing transferring the device from the initial OS 22 to the versatile OS 21.

A process flow on the side of the initial OS 22 will be explained using FIG. 8.

First, the initial OS 22 stores the states of the devices used by the initial OS in the device state management table 51 (S700). Data stored in the device state management table 51 is data necessary to, when starting to use the devices having been used by the initial OS on the versatile OS 21, use the devices with their states continued. This processing is performed by the transfer preparation section 222.

Next, the initial OS 22 stores the state of the specific processing application 41 in the application state management table 52 (S701). The data to be stored in the application state management table 52 is data necessary for continuing, when executing the specific processing application 32 on the versatile OS 21, the state of the specific processing application 41 having been executed on the initial OS 22. This processing is performed by the transfer preparation section 222.

Next, the initial OS 22 notifies the versatile OS 21 of completing preparation for the device transfer (S702).

Next, the initial OS 22 checks whether the specific processing is being performed (S703). When being performed, the initial OS 22 repeats checking until a specific-processing end event is generated (S704). After the specific-processing end event is generated, the specific processing is ended (S705). This processing is performed by the transfer notification section 223. In addition, the initial OS 22 ends the processing after the notification.

Next, a process flow on the side of the versatile OS 21 will be explained using FIG. 9.

After being activated, the versatile OS 21 waits for a device transfer notification from the initial OS 22 (S706). This processing may be a busy loop, or may perform main processing of the system while waiting, and receive a notification by interruption.

After receiving a device transfer notification, the versatile OS 21 refers to the device state management table 51 to obtain the states of the devices 7 used by the initial OS (S707). This processing is performed by the start usage section 213.

Next, the versatile OS 21 refers to the application state management table 52 to obtain the state of the specific processing application 41 (S708). This processing is performed by the start usage section 213.

Next, the versatile OS 21 starts using the devices 7 having been used by the initial OS (S709). This processing is performed by the start usage section 213.

Next, the versatile OS 21 determines whether to perform the specific processing (S710). The determination method may be a method in which the versatile OS 21 determines on the basis of contents reported through the application state management table 52 from the initial OS 22 to the versatile OS 21, or may be a method in which the existence of a specific-processing start event is checked by the state of the sensor 3. In the later method, for example in a case where the specific processing is to display a rear view camera image, it suffices that whether or not the transmission is in reverse gear is checked using the sensor 3.

If the specific processing is to be performed, the versatile OS 21 starts the specific processing application 32 in the versatile OS 21 (S711) on the basis of values obtained from the device state management table 51 and the application state management table 52. This processing is performed by the start usage section 213.

In addition, the initial OS 22 has already stored initialization state information of the device 4 for specific processing in the device state management table 51 (S700); in S711, specific processing to be activated is selected according to the initialization state information. More specifically, in a case where device initialization is completed only up to the initialization processing A(60) explained using FIG. 5, the specific processing a(62) is performed; in a case where it is completed up to the initialization processing B(61), the specific processing b(63) is performed. In S712, whether a specific-processing end event is generated is checked. If generated, the specific processing b(63) is ended in S713. While being not generated, the specific processing b(63) is repeated (S711).

Next, the versatile OS 21 determines whether the initialization of the device 4 for specific processing is completed (S714); if completed, transferring of the devices 7 used by the initial OS is completed. If not completed, the versatile OS 21 performs the rest of the initialization processing to complete the transfer of the devices 7 used by the initial OS (S715). This processing is performed by the initialization section 214.

By the above processing, the devices 7 used by the initial OS have been transferred from the initial OS 22 to the versatile OS 21. Hereafter, the devices 7 used by the initial OS are access-controlled by the versatile OS 21.

After completing transferring the devices from the second core 12 to the first core 11, the initial OS 22 ends the processing. In the wake of ending of the initial OS 22, the initial-OS memory area 40 is integrated to the versatile-OS memory area 30.

Figure 10:
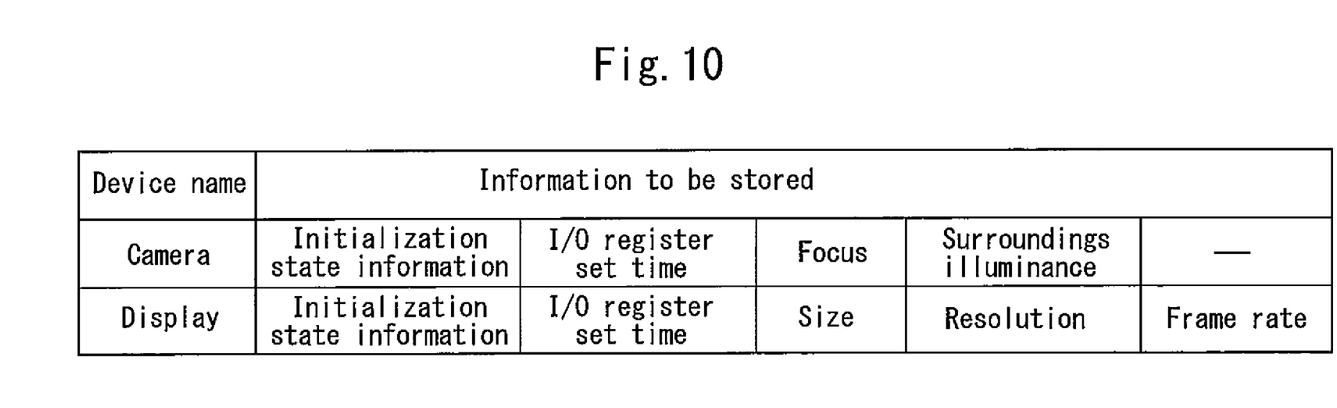
FIG. 10 is a format of a device state management table according to Embodiment 1.

A device state management table 51 is shown in FIG. 10, taking a rear view camera display as an example. It is assumed that the device 4 for specific processing is a camera and the output device 5 is a display or the like. Initialization state information of the devices 7 used by the initial OS, an I/O register set time, and the like are considered to be information commonly used among all devices.

Figure 5:
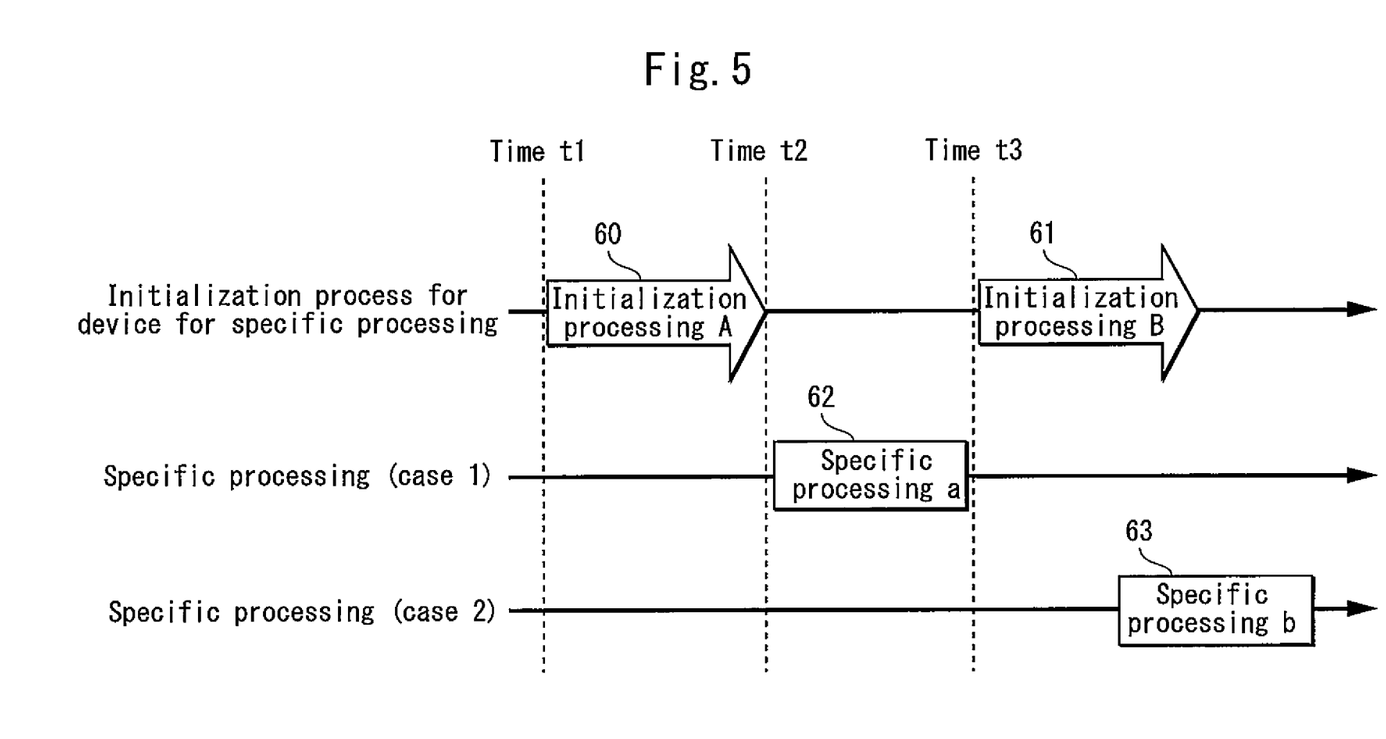
FIG. 5 is a state transition diagram explaining that specific processing is performed according to an initialization state of the device for specific processing according to Embodiment 1.

The initialization state information is progress information indicating up to which initialization step in FIG. 5 each of the devices 7 used by the initial OS has been initialized. An I/O register set time is information indicating how much time has elapsed since the last time when the I/O register was set.

There are devices that should not be accessed for a certain period after the last time when the I/O register was set, and there are devices that should be set again within a certain period after the last time when the I/O register was set. In a case where the device 4 for specific processing is such a device, it is necessary to notify the versatile OS of an I/O register set time; therefore, the information is stored.

A focus set to the camera, surroundings illuminance for correcting the camera brightness, and the like are considered as camera information. The display size, a resolution setting, a frame rate and the like are considered as the display information.

By obtaining the information in advance, the versatile OS 21 can start using the device having been used by the initial OS 22 with the device state being maintained after the device transfer. Furthermore, in the specific processing application 32, the versatile OS 21 just refers to the device state management table 51, to obtain information necessary for starting using the device without accessing the device, thereby reducing time necessary for starting using the device.

Figure 11:
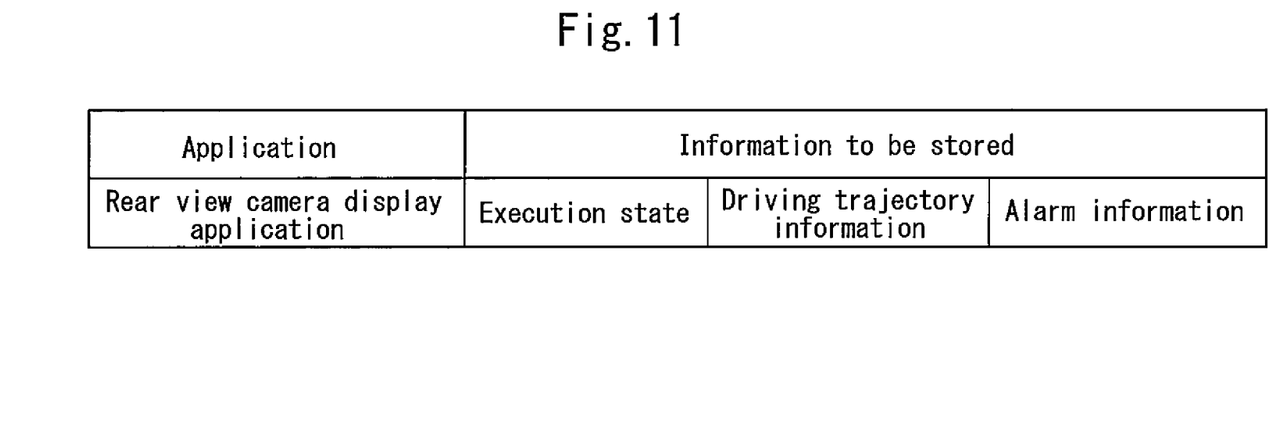
FIG. 11 is a format of an application state management table according to Embodiment 1.

FIG. 11 shows the application state management table 52, taking a rear-view-camera display application as an example. Driving trajectory information, alarm information about obstacles, or the like to be expected when driving backward from that state may be displayed on a screen image of the rear view camera. Therefore, the driving trajectory information, the alarm information, or the like which is currently being displayed is expected to be stored. Furthermore, when the processing for transferring the device from the initial OS 22 to the versatile OS 21 is started, the execution state of the specific processing application 41 being executed on the side of the initial OS 22 is stored.

By obtaining such information in advance on the side of the versatile OS 21, the versatile OS 21 can start the application having been executed on the initial OS 22 with the application state being maintained after the device transfer. The application that has ended its processing and does not need to be repeated is managed so as not to be executed, which can reduce time necessary to start using the device.

As described above, there are provided the initialization section 220 to perform initialization processing step by step when initializing the device 4 for specific processing, and the determination section 221 to determine to start performing the specific processing according to the initialization state, making it possible to, when a specific-processing start event is generated, perform the specific processing according to the completed initialization steps. This makes it possible to perform specific processing responding to a specific-processing start event even before the entire processing to initialize the device 4 for specific processing is completed.

Furthermore, as described above, there are provided the device state management table on which to record the states of the devices 7 used by the initial OS after completing initializing the devices 7 on the initial OS, and the application state management table on which to record the state of the specific processing application 41 thereafter. This makes it unnecessary to inquire the devices used by the initial OS when the devices used by the initial OS are transferred from the initial OS to the versatile OS, making it possible to reduce time necessary for the transfer. Furthermore, in a case where there is information available only when initializing the devices used by the initial OS, the information can be referred to even from the versatile OS to which the device is transferred.

REFERENCE SIGNS LIST 1 information apparatus
2 memory
3 sensor
4 device for specific processing
5 output device
6 other device
7 device used by initial OS
10 processor
11 first core
12 second core
13 first timer
14 second timer
20 nonvolatile memory
21 versatile OS
22 initial OS
23 bootloader
30 versatile-OS memory area
31 main function processing application
32 specific processing application
40 initial-OS memory area
41 specific processing application
50 shared memory
51 device state management table
52 application state management table
60 initialization processing A
61 initialization processing B
62 specific processing a
63 specific processing b
210 versatile-OS activation section
211 waiting section
212 completion notification section
213 start usage section
214 initialization section
215 determination section
220 initialization section
221 determination section
222 transfer preparation section
223 transfer notification section

The invention claimed is:

1. An information apparatus comprising:
a memory having stored therein an initial operating system, a versatile operating system, and a bootloader; and
a processor configured to
    execute, upon powering on, the bootloader to load the versatile operating system and the initial operating system for execution,
    execute, using a first control unit, the versatile operating system to run first software that performs processing using one or more devices connected to the information apparatus, the one or more devices operating according to a plurality of setting information generated by a plurality of initialization processes, and
    execute, using a second control unit, an initial operating system to run second software that operates a specific one of the one or more devices connected to the information apparatus using part of the setting information generated by the plurality of initialization processes and performs a specific process using the specific device at a stage when part of the plurality of initialization processes is completed and before the first software is executed,
    perform the plurality of initialization processes for the one or more devices, wherein the second control unit performs at least one of the plural initialization processes for the specific device to notify the first control unit of progress information about the at least one of the plural initialization processes, and the first control unit performs the remaining and unperformed initialization processing out of the plural initialization processes on the basis of the progress information, upon completion by the first control unit of all the plurality of initialization processes control of the specific device is transferred from the initial operating system executing on the second control unit to the versatile operating system executing on the first control unit.

2. The information apparatus according to claim 1, wherein the activation of the versatile operating system by the first control unit and the activation the initial operating system by the second control unit are executed in parallel by the processor.

3. The information apparatus according to claim 2, wherein after the versatile operating system is activated, the second control unit notifies the first control unit that control of the specific device is ready to be transferred.

4. The information apparatus according to claim 3, wherein the second software reports the second software's execution state, and the first control unit executes the first software based on the execution state.

5. The information apparatus according to claim 4, wherein after all the plurality of initialization processes are completed, the second software reports the second software's execution state.

* * * * *